(12) United States Patent
Ren et al.

(10) Patent No.: US 10,745,565 B2
(45) Date of Patent: Aug. 18, 2020

(54) ENVIRONMENT-FRIENDLY LEUCO DYE VEGETABLE OIL SOLVENT

(71) Applicant: SUZHOU FENGBEI BIOTECH CO., LTD., Suzhou, Jiangsu Province (CN)

(72) Inventors: Peng Ren, Suzhou (CN); Yuan Ping, Suzhou (CN); Min Ma, Zhangjiagang (CN); Menglong Zhou, Zhoukou (CN); Xuejuan Mao, Zhangjiagang (CN)

(73) Assignee: SUZHOU FENGBEI BIOTECH CO., LTD., Suzhou, Jiangsu Province (CN)

( * ) Notice: Subject to any disclaimer, the term of this patent is extended or adjusted under 35 U.S.C. 154(b) by 0 days.

(21) Appl. No.: 16/236,605

(22) Filed: Dec. 30, 2018

(65) Prior Publication Data

US 2019/0136064 A1    May 9, 2019

Related U.S. Application Data

(63) Continuation of application No. PCT/CN2017/094678, filed on Jul. 27, 2017.

(30) Foreign Application Priority Data

Aug. 30, 2016  (CN) .......................... 2016 1 0767619

(51) Int. Cl.
| | |
|---|---|
| *C09B 67/00* | (2006.01) |
| *C11C 3/00* | (2006.01) |
| *C09B 11/26* | (2006.01) |
| *C09B 61/00* | (2006.01) |
| *C09B 67/10* | (2006.01) |
| *C09B 67/44* | (2006.01) |

(52) U.S. Cl.
CPC .......... *C09B 67/0014* (2013.01); *C09B 11/26* (2013.01); *C09B 61/00* (2013.01); *C09B 67/0083* (2013.01); *C11C 3/00* (2013.01); *C11C 3/003* (2013.01)

(58) Field of Classification Search
CPC . C09B 16/0014; C09B 16/0083; C09B 11/26; C09B 61/00; C11C 3/00; C11C 3/003
See application file for complete search history.

(56) References Cited

U.S. PATENT DOCUMENTS

| | | | | | |
|---|---|---|---|---|---|
| 3,988,247 | A | * | 10/1976 | Dieckelmann ........ | C07C 309/00 252/8.57 |
| 4,451,261 | A | * | 5/1984 | Willmund ............ | C07C 309/00 8/94.22 |

FOREIGN PATENT DOCUMENTS

| | | |
|---|---|---|
| CN | 1135421 A | 11/1996 |
| CN | 103046433 A | 4/2013 |
| CN | 106398305 A | 2/2017 |
| CN | 106400589 A | 2/2017 |
| WO | 2018/040811 A1 | 3/2018 |

\* cited by examiner

*Primary Examiner* — Amina S Khan
(74) *Attorney, Agent, or Firm* — Cheng-Ju Chiang

(57) ABSTRACT

The invention discloses an environment-friendly leuco dye vegetable oil solvent, prepared from the following components by mass percent: 10-40% of component A, 40-750% of component B and 10-20% of methyl chloride, and the sum of the mass percentage of the above components being 100%. The component A is vegetable oil or vegetable oil methyl ester, and the component B is epoxy vegetable oil or epoxy methyl ester.

11 Claims, No Drawings

ENVIRONMENT-FRIENDLY LEUCO DYE VEGETABLE OIL SOLVENT

CROSS REFERENCE TO RELATED APPLICATION

This non-provisional patent application is a continuation application of International Application PCT/CN2017/094678, filed on Jul. 27, 2017, which claims benefit of Chinese patent application No. 201610767619.4, filed on Aug. 30, 2016. The entire contents of which are incorporated herein by reference.

TECHNICAL FIELD

The present invention relates to the field of vegetable oil solvent, in particular to an environment-friendly leuco dye vegetable oil solvent.

BACKGROUND

Carbonless copy paper (CCP) has entered China since the early 1980s, and it became popular among users because of its convenient and fast use. With the expansion of electronic computer networks, the expansion of business service areas, and increasing amount of intelligence information, the demand for carbonless copy paper will greatly increase. The carbonless copy paper mainly uses color reaction between the dye solvent and the acid developer to achieve the effect of copy. Most of the dye solvents used in today's carbonless copy paper and ballpoint pens are benzene solvents, of which diphenylethane and diisopropylnaphthalene are the most common, but such solvents have the following disadvantages:

1. having an irritating effect, damaging heart, liver and kidney, having a certain toxicity to the nervous system and digestive system, not benefit to health of human body, and not meeting the state's requirement for environmental protection;
2. harmful to the environment, causing pollution to the atmosphere;
3. large VOCs (>100 mg/g) emissions and high environmental costs;
4. low flash point and having a risk of burning due to heating.

SUMMARY

In order to overcome the deficiencies of the prior art, the object of the present invention is to provide an environment-friendly leuco dye vegetable oil solvent which adopts purely natural raw material, can be biodegraded, and is non-toxic, non-irritating and safe. It has a wide range of applications and is an environmental friendly and pollution-free solvent.

The object of the present invention can be achieved by adopting the following technical solutions:

An environment-friendly leuco dye vegetable oil solvent is prepared by the following mass percentage components: 0-40% of component A, 40-100% of component B, 0-20% of chlorinated fatty acid methyl ester, the sum of the above mass percentages of the components being 100%, component A being vegetable oil or a vegetable oil methyl ester, and component B being an epoxy vegetable oil or an epoxy methyl ester.

Preferably, the vegetable oil of component A is one or more of castor oil, soybean oil, corn oil, palm oil, canola oil, cottonseed oil, peanut oil and sunflower seed oil.

Preferably, the vegetable oil methyl ester of component A is prepared from vegetable oil by a methyl esterification modification method, the epoxy vegetable oil of component B is prepared from vegetable oil by an epoxidation modification method, the methyl epoxidate of component B is prepared from vegetable oil methyl ester by an epoxidation modification method, and the chlorinated fatty acid methyl ester is prepared from vegetable oil methyl ester by a chlorine substitution modification method.

Preferably, steps of the methyl esterification modification method of the vegetable oil are as follows:

1) adding the vegetable oil, methanol and sulfuric acid in a reaction kettle which is heated to 110° C. on an electric furnace, after the pressure being raised to 0.4 MPa, removing the electric furnace and the pressure being reduced to a normal pressure to obtain a pre-esterified product;

2) the potassium hydroxide being dissolved in methanol, the mass ratio of methanol to potassium hydroxide being (5-60):1, and then the pre-esterified product obtained in step 1) being added, the temperature being controlled at 60° C., and being stirred for 1 h to obtain a transesterification reaction solution;

3) separating the transesterification reaction solution obtained in step 2) and keeping the upper layer and removing the lower layer of glycerol, and the methyl ester phase being washed with water to remove the saponified product to obtain a crude methyl ester, the crude methyl ester being placed in a three-mouth flask, and the temperature being controlled between 100° C. and 120° C. to remove methanol and water by distilling to obtain a crude vegetable oil methyl ester;

4) distilling the crude vegetable oil methyl ester obtained in step 3) under a reduced pressure and at a vacuum of 0.095 MPa to 1 MPa and a temperature of 225° C. to 275° C. to obtain a vegetable oil methyl ester.

Preferably, a mass ratio of vegetable oil, methanol and concentrated sulfuric acid in step 1) is (60-90):(30-70):1, and the mass ratio of methanol and potassium hydroxide in step 2) is (5-60):1.

Preferably, the steps of the epoxy modified method are as follows:

1) mixing formic acid and catalyst together to form a formic acid solution, then slowly adding hydrogen peroxide into the formic acid solution to form a mixture, controlling the temperature to be less than 10° C., and the mixture being coldly stored overnight, the catalyst being one of concentrated sulfuric acid and phosphotungstic acid;

2) adding C raw material, raising the temperature to 40-50° C., and then adding peroxyformic acid dropwise for 1-2 h, raising the temperature to a reaction temperature of 50-70° C., keeping reaction at the reaction temperature for 2-6 h;

3) separating a crude product after the reaction into phases to obtain an upper oil phase, a lower aqueous acid phase being recycled;

4) being washed with alkali solution to slightly acidic with pH=5-6, then being washed with water to pH=7; then the upper oil phase being separated out from the others, the alkali solution being one of sodium bicarbonate, potassium hydroxide and sodium hydroxide;

5) distilling under a reduced pressure to remove water to obtain a final product D;

the raw material C is vegetable oil and D is epoxy vegetable oil.

Preferably, the raw material C is vegetable oil methyl ester and D is epoxy methyl ester.

Preferably, a mass ratio of formic acid, catalyst and hydrogen peroxide in step 1) is (0.5-0.7):1:(1-0.9) and the mass ratio of the raw material C to peroxyformic acid in step 2) is (5-7):1.

Preferably, the steps of chlorine substitution modification method of the vegetable oil methyl ester are as follows:

1) mixing vegetable oil methyl ester and methanol, and then adding catalyst to obtain a mixed solution, the catalyst being benzoyl peroxide or azodiisobutyronitrile; and 2) introducing Chlorine gas into the mixed solution obtained in step 1) and controlling the temperature at 70-85° C. and the reaction time for 7-8 h to obtain a chlorinated fatty acid methyl ester.

Preferably, a mass ratio of the vegetable oil methyl ester, methanol and catalyst in step 1) is (100-200):(10-20):1 and the flow rate of the chlorine gas in the step 2) is 50-60 mL/min.

The beneficial effects of the invention are as follows:

1、 The vegetable oil solvent of the present invention adopts pure natural vegetable oil raw material which can be biodegraded, and the vegetable oil solvent is non-toxic, non-irritating, safe and wide in application, and is an environmental friendly and pollution-free vegetable oil solvent;

2、 The solvent oil of the present invention has advantage of high flash point, safe use, convenient storage, low volatility and mild odor, and is superior to the traditional petrochemical solvent in these aspects. The solvent oil has excellent compatibility and synergy with other components, which makes the mixed components easier to emulsify without affecting the stability of dissolution;

3、 The raw material of the invention has no benzene solvent. Thus, it is beneficial to health of human body, meeting the requirements of the state for environmental protection, and being suitable for large-scale industrial production.

DETAILED DESCRIPTION OF THE EMBODIMENTS

Hereinafter, the present invention will be further described in conjunction with specific embodiments:

An environment-friendly leuco dye vegetable oil solvent is prepared by the following mass percentage components: 0-40% of component A, 40-100% of component B, 0-20% of chlorinated fatty acid methyl ester. The sum of the above mass percentages of the components is 100%. Component A is vegetable oil or a vegetable oil methyl ester, and component B is an epoxy vegetable oil or an epoxy methyl ester.

The vegetable oil of component A is one or more of castor oil, soybean oil, corn oil, palm oil, rapeseed oil, cottonseed oil, peanut oil and sunflower oil. The vegetable oil methyl ester of component A is prepared from vegetable oil by a methyl esterification modification method. The epoxy vegetable oil of component B is prepared from vegetable oil by an epoxidation modification method, and the epoxy methyl ester of component B is prepared from vegetable oil methyl ester by an epoxidation modification method. The chlorinated fatty acid methyl ester is prepared from vegetable oil methyl ester by a chlorine substitution modification method.

Wherein, the steps of the methyl esterification modification method of vegetable oil are as follows:

1) adding vegetable oil, methanol and concentrated sulfuric acid in a mass ratio of (60-90):(30-70):1 into a reaction kettle which is heated to 110° C. in an electric furnace. After the pressure is raised to 0.4 MPa, the reaction kettle is moved away from the electric furnace and the pressure is reduced to a normal pressure such that a pre-esterified product is obtained;

2) dissolving potassium hydroxide in methanol, the mass ratio of methanol to potassium hydroxide being (5-60):1, and then the pre-esterified product obtained in the step 1) being added, the temperature being controlled at 60° C., and being stirred for 1 h to obtain a transesterification reaction solution;

3) the transesterification reaction solution obtained in the step 2) being separated and keeping the upper layer and removing the lower layer of glycerol, and the methyl ester phase being washed with water to remove the saponified product to obtain a crude methyl ester; the crude methyl ester being placed in a three-mouth flask, and the temperature being controlled between 100° C. and 120° C. to remove methanol and water by distilling to obtain a crude vegetable oil methyl ester;

4) distilling the crude vegetable oil methyl ester obtained in step 3) under a reduced pressure and at a vacuum of 0.095 MPa to 1 MPa and a temperature of 225° C. to 275° C. to obtain a vegetable oil methyl ester.

Wherein the steps of the epoxidation modification method are as follows:

1) mixing the formic acid and a catalyst together to form an acid solution, then slowly adding hydrogen peroxide into the formic acid solution, the temperature being controlled to be less than 10° C., and the mixture being coldly stored overnight. The catalyst is one of concentrated sulfuric acid and phosphotungstic acid. The mass ratio of formic acid, catalyst, and hydrogen peroxide is (0.5-0.7):1:(1-0.9).

2) Adding C raw material, raising the temperature to 40-50° C., and then adding 30 g-40 g peroxyformic acid dropwise for 1-2 h, raising the temperature to the reaction temperature of 50-70° C., keeping reaction at the reaction temperature for 2-6 h. The mass ratio of C raw materials to the peroxyformic acid is (5-7):1;

3) separating the crude product after the reaction into phases to obtain an upper oil phase, a lower aqueous acid phase being recycled.

4) being washed with alkali solution to slightly acidic with pH=5-6, then being washed with water to pH=7; then the upper oil phase being separated out from the others; the alkali solution being one of sodium bicarbonate, potassium hydroxide and sodium hydroxide.

5) distilling under a reduced pressure to remove water to obtain a final product D.

The C raw material is vegetable oil and D is an epoxy vegetable oil. Preferably, the C raw material is vegetable oil methyl ester and D is epoxy methyl ester.

Wherein, the steps of the chlorine substitution modification method of vegetable oil methyl ester are as follows:

1) mixing vegetable oil methyl ester and methanol, and then adding a catalyst to obtain a mixed solution, wherein the catalyst is one of benzoyl peroxide and azobisisobutyronitrile. The mass ratio of vegetable oil methyl ester, methanol and catalyst is (100)-200):(10-20):1;

2) adding Chlorine gas into the mixture obtained in step 1) to obtain a chlorinated fatty acid methyl ester, the flow rate of chlorine gas being 50-60 mL/min, the temperature being controlled to 70-85° C., and the reaction time being 7-8 h.

Example 1

An environmentally friendly leuco dye vegetable oil solvent prepared from the following mass percentage components: soybean oil 40%, epoxy corn oil 50%, chlorinated fatty acid methyl ester 10%.

Wherein the steps of the epoxidation modification method of the epoxy corn oil are as follows:

1) Mixing 50 g of formic acid with 75 g of concentrated sulfuric acid, then slowly adding 75 g of hydrogen peroxide to the formic acid solution, controlling the temperature to be less than 10° C., and the solution being coldly stored overnight;

2) Adding 150 g of corn oil, heating to 48° C., and then adding 30 g of peroxyformic acid drop by drop for 1 h, heating to the reaction temperature of 50° C., and keeping the reaction at the reaction temperature for 4 h;

3) after the reaction, the crude product being separated into phases to obtain an upper oil phase, and the lower aqueous acid phase being recovered;

4) washing with sodium bicarbonate to slightly acidic pH=5-6, then washing with water to pH=7; then separating the upper oil phase;

5) distilling under reduced pressure to remove water to thereby obtain the final product of epoxidized corn oil.

Wherein the preparation method of chlorinated fatty acid methyl ester is as follows:

1) mixing 30 g of vegetable oil methyl ester and 3 g of methanol, and then adding 0.15 g of benzoyl peroxide to obtain a mixed solution;

2) introducing Chlorine gas into the mixture obtained in step 1) to obtain a chlorinated fatty acid methyl ester, the flow rate of chlorine gas being 50 mL/min, the temperature being controlled at 70-85° C., and the reaction time being 7 h.

Example 2

An environmentally friendly leuco dye vegetable oil solvent prepared from the following mass percentage components: castor oil 38%; epoxy rapeseed oil 60%, chlorinated fatty acid methyl ester 12%.

Wherein the steps of the epoxidation modification method of the epoxy rapeseed oil are as follows:

1) Mixing 50 g of formic acid with 90 g of concentrated sulfuric acid, then slowly adding 82 g of hydrogen peroxide to the formic acid solution, controlling the temperature to be less than 10° C., and the solution being stored coldly overnight;

2) adding 180 g of rapeseed oil, raising the temperature to 40° C., and then adding 90 g of peroxyformic acid drop by drop for 1.3 h, the temperature being raised to the reaction temperature of 60° C., and keeping the reaction at the reaction temperature for 3.5 h;

3) After the reaction, the crude product being separated into phases to obtain an upper oil phase, and the lower aqueous acid phase being recovered;

4) washing with sodium hydroxide to slightly acidic pH=5-6, then washing with water to pH=7; then separating the upper oil phase;

5) distilling under reduced pressure to remove water to obtain the final product of epoxy rapeseed oil.

Wherein the preparation method of chlorinated fatty acid methyl ester is as follows:

1) mixing 36 g of vegetable oil methyl ester and 3.6 g of methanol, and then adding 0.18 g of benzoyl peroxide to obtain a mixed solution;

2) introducing Chlorine gas into the mixed solution obtained in step 1) to obtain a chlorinated fatty acid methyl ester, the flow rate of chlorine gas being 55 mL/min, the temperature being controlled at 75° C., and the reaction time being 7.5 h.

Example 3

An environmentally friendly leuco dye vegetable oil solvent prepared from the following mass percentage components: peanut oil 10%; epoxy palm oil 75%, chlorinated fatty acid methyl ester 15%.

Wherein the steps of the epoxidation modification method of the epoxy rapeseed oil are as follows:

1) Mixing 55 g of formic acid with 100 g of concentrated sulfuric acid, then slowly adding 95 g of hydrogen peroxide to the formic acid solution, controlling the temperature at less than 10° C., and the solution being coldly stored overnight;

2) adding 180 g of palm oil, the temperature being raised to 45° C., and then adding 30 g of peroxyformic acid drop by drop for 2 h, the temperature being raised to the reaction temperature of 70° C., and keeping the reaction at the reaction temperature for 2 h;

3) after the reaction, the crude product being separated into phases to obtain an upper oil phase, and the lower aqueous acid phase being recovered;

4) washing with sodium hydroxide to slightly acidic pH=5-6, then washing with water to pH=7; then separating the upper oil phase;

5) distilling under reduced pressure to remove water to obtain the final product of epoxy palm oil.

Wherein the preparation method of chlorinated fatty acid methyl ester is as follows:

1) mixing 36 g of vegetable oil methyl ester and 1.8 g of methanol, and then adding 0.32 g of benzoyl peroxide to obtain a mixed solution;

2) introducing Chlorine gas into the mixed solution obtained in step 1) to obtain a chlorinated fatty acid methyl ester, the flow rate of chlorine gas being 60 mL/min, the temperature being controlled at 75° C., and the reaction time being 7.5 h.

Example 4

An environment-friendly leuco dye vegetable oil solvent is prepared from the following mass percentage components: peanut oil methyl ester 10%; methyl acrylate 75% and chlorinated fatty acid methyl ester 15%.

Wherein the steps of the methyl esterification modification method of peanut oil methyl ester are as follows:

1) adding 18 g of peanut oil, 10 g of methanol and 0.3 g of concentrated sulfuric acid into a reaction kettle which is heated to 110° C. on an electric furnace, and the pressure being raised to 0.4 MPa, and then the pressure being reduced to normal pressure to obtain a pre-esterified product;

2) after dissolving 2 g of potassium hydroxide in 0.4 g of methanol, adding the pre-esterified product obtained in step 1), controlling the temperature at 60° C., and stirring for 1 h to obtain a transesterification reaction solution;

3) The transesterification reaction solution obtained in step 2) being separated, keeping the upper layer and removing the lower layer of glycerol, and the methyl ester phase being washed with water to remove the saponified product to obtain a crude methyl ester; the crude methyl ester being placed in a flask with three mouths, and distilling at a temperature less than 100° C. to remove the methano and water and obtain a crude peanut oil methyl ester;

4) the crude peanut oil methyl ester obtained in the step 3) being distilled under reduced pressure at a vacuum of 0.095 MPa and a temperature of 225° C. to obtain a peanut oil methyl ester.

Wherein the preparation method of methyl epoxide is as follows:

1) mixing 40 g of formic acid with 45 g of phosphotungstic acid, and then slowly adding 45 g of hydrogen peroxide to the formic acid solution, controlling the temperature to less than 10° C., and the solution being coldly stored overnight;

2) adding 200 g of palm oil, raising the temperature to 45° C., and then adding 40 g of peroxyformic acid dropwise drop by drop for 2 h, raising the temperature to the reaction temperature of 70° C., keeping the reaction at the reaction temperature for 2 h;

3) after the reaction, the crude product being separated into phases to obtain an upper oil phase, and the lower aqueous acid phase being recovered;

4) washing with sodium bicarbonate to a slightly acidic pH=5-6, then washing with water to pH=7; then separating and obtaining the upper oil phase;

5) distilling under at reduced pressure to remove water to thereby obtain the final product of epoxy palm oil.

Wherein the preparation method of chlorinated fatty acid methyl ester is as follows:

1) mixing 40 g of vegetable oil methyl ester and 4 g of methanol, and then adding 0.4 g of azobisisobutyronitrile to obtain a mixed solution;

2) intruding Chlorine gas into the mixed solution obtained in step 1) to obtain a chlorinated fatty acid methyl ester, the flow rate of chlorine gas being 60 mL/min, the temperature being controlled at 75° C., and the reaction time being 7.5 h.

Example 5

An environmentally friendly leuco dye vegetable oil solvent prepared from the following mass percentage components: sunflower oil 10%; methyl acrylate 75%, chlorinated fatty acid methyl ester 15%.

Wherein the preparation method of methyl epoxide is as follows:

1) mixing 40 g of formic acid with 45 g of phosphotungstic acid, and then slowly adding 45 g of hydrogen peroxide to the formic acid solution, controlling the temperature to less than 10° C., and the solution being coldly stored overnight;

2) Adding 200 g of palm oil, raising the temperature to 45° C., and then adding 40 g of peroxyformic acid dropwise for 2 h, raising the temperature to the reaction temperature of 70° C., keep the reaction at the reaction temperature for 2 h;

3) after the reaction, the crude product being separated into phases to obtain an upper oil phase, and the lower aqueous acid phase being recovered;

4) washing with potassium hydroxide to slightly acidic pH=5-6, then washing with water to pH=7; then separating and obtaining the upper oil phase;

5) distilling under reduced pressure to remove water to thereby obtain the final product of epoxy palm oil.

Wherein the preparation method of chlorinated fatty acid methyl ester is as follows:

1) mixing 40 g of vegetable oil methyl ester and 4 g of methanol, and then adding 0.4 g of azobisisobutyronitrile to obtain a mixed solution;

2) introducing Chlorine gas into the mixed solution obtained in step 1) to obtain a chlorinated fatty acid methyl ester, the flow rate of chlorine gas being 60 mL/min, the temperature being controlled at 75° C., and the reaction time being 7.5 h.

The performance test of the vegetable oil solvent of Examples 1-5 of the present invention was carried out and the test results are shown in the following tables:

1. Stability Test

According to the mass percentage of leuco dye 5%, solvent oil 95% mixed and dissolved, the performance of the dye after dissolution is tested, and the vegetable oil solvent obtained in Examples 1-5 is added to the leuco dye crystal violet lactone (CVL) according to the ratio. The crystal precipitation was tested at 25° C. and 8° C. respectively. The test results are shown in Table 1:

TABLE 1

| Stability test table | | |
|---|---|---|
| | 25° C. | 8° C. |
| Example 1 | no precipitation at 24 h, no precipitation at 48 h | no precipitation at 24 h, no precipitation at 48 h |
| Example 2 | No precipitation at 24 h, no precipitation at 48 h | no precipitation at 24 h, no precipitation at 48 h |
| Example 3 | No precipitation at 24 h, no precipitation at 48 h | no precipitation at 24 h, no precipitation at 48 h |
| Example 4 | No precipitation at 24 h, no precipitation at 48 h | no precipitation at 24 h, no precipitation at 48 h |
| Example 5 | No precipitation at 24 h, no precipitation at 48 h | no precipitation at 24 h, no precipitation at 48 h |

2、Color Rendering Performance Experiment

According to the national standard GB 16797-2008 carbonless copy paper Appendix C measurement, the measurement results are shown in Table 2:

TABLE 2

| Color rendering performance test table | | |
|---|---|---|
| | Test article | superior product |
| Example 1 | 72 | 60 |
| Example 2 | 70 | 60 |
| Example 3 | 75 | 60 |
| Example 4 | 71 | 60 |
| Example 5 | 74 | 60 |

It can be seen from the results of the above-mentioned stability test table and color test performance test table that the examples 1-5 of the present invention have no crystal precipitation at 25° C., 8° C. for 24 hours and 48 hours, and color development performance is the performance of superior products.

Therefore, the technical solutions of embodiments of the present invention have been clearly and completely described above. Apparently, the described embodiments are merely part of, rather than all of, the embodiments of the present invention. A person skilled in the art may make various combinations of technical features in the various embodiments to meet practical needs. Based on the described embodiments of the present invention, any other embodiment obtained by a person skilled in the art without paying creative efforts shall also fall within the scope of the present invention.

What is claimed is:

1. An environment-friendly leuco dye vegetable oil solvent, wherein the vegetable oil solvent is prepared by the following mass percentage components: 10-40% of component A, 40-75% of component B, 10-20% of chlorinated fatty acid methyl ester, the sum of the above mass percentages of the components being 100%, component A being vegetable oil or a vegetable oil methyl ester, and component B being an epoxy vegetable oil or an epoxy methyl ester.

2. The environment-friendly leuco dye vegetable oil solvent of claim 1, wherein the vegetable oil of component A is a vegetable oil or at least two vegetable oils selected from a group consisting of castor oil, soybean oil, corn oil, palm oil, canola oil, cottonseed oil, peanut oil and sunflower seed oil.

3. The environment-friendly leuco dye vegetable oil solvent of claim 2, wherein the vegetable oil methyl ester of component A is prepared from vegetable oil by a methyl esterification modification method, the epoxy vegetable oil of component B is prepared from vegetable oil by an epoxidation modification method, the methyl epoxidate of component B is prepared from vegetable oil methyl ester by an epoxidation modification method, and the chlorinated fatty acid methyl ester is prepared from vegetable oil methyl ester by a chlorine substitution modification method.

4. The environment-friendly leuco dye vegetable oil solvent of claim 3, wherein steps of the methyl esterification modification method of the vegetable oil are as follows:
1) adding the vegetable oil, methanol and sulfuric acid in a reaction kettle which is heated to 110° C. on an electric furnace, after the pressure being raised to 0.4 MPa, removing the electric furnace and the pressure being reduced to a normal pressure to obtain a pre-esterified product;
2) the potassium hydroxide being dissolved in methanol, the mass ratio of methanol to potassium hydroxide being (5-60): 1, and then the pre-esterified product obtained in step 1) being added, the temperature being controlled at 60° C., and being stirred for 1 h to obtain a transesterification reaction solution;
3) separating the transesterification reaction solution obtained in step 2) and keeping the upper layer and removing the lower layer of glycerol, and the methyl ester phase being washed with water to remove the saponified product to obtain a crude methyl ester, the crude methyl ester being placed in a three-mouth flask, and the temperature being controlled between 100° C. and 120° C. to remove methanol and water by distilling to obtain a crude vegetable oil methyl ester;
4) distilling the crude vegetable oil methyl ester obtained in step 3) under a reduced pressure and at a vacuum of 0.095 MPa to 1 MPa and a temperature of 225° C. to 275° C. to obtain a vegetable oil methyl ester.

5. The environment-friendly leuco dye vegetable oil solvent of claim 4, wherein a mass ratio of vegetable oil, methanol and concentrated sulfuric acid in step 1) is (60-90):(30-70): 1.

6. The environment-friendly leuco dye vegetable oil solvent of claim 3, wherein steps of the epoxy modified method are as follows:
1) mixing formic acid and catalyst together to form a formic acid solution, then slowly adding hydrogen peroxide into the formic acid solution to form a mixture, controlling the temperature to be less than 10° C., and the mixture being coldly stored overnight, the catalyst being a selective one from a group consisting of concentrated sulfuric acid and phosphotungstic acid;
2) adding raw material C, raising the temperature to 40-50° C., and then adding peroxyformic acid dropwise for 1-2h, raising the temperature to a reaction temperature of 50-70° C., keeping reaction at the reaction temperature for 2-6h;
3) separating a crude product after the reaction into phases to obtain an upper oil phase, a lower aqueous acid phase being recycled;
4) being washed with alkali solution to slightly acidic with pH=5-6, then being washed with water to pH=7, then the upper oil phase being separated from the others, the alkali solution being a selective one from a group consisting of sodium bicarbonate, potassium hydroxide and sodium hydroxide;
5) distilling under a reduced pressure to remove water to obtain a final product D;
wherein the raw material C is vegetable oil or vegetable oil methyl ester and D is epoxy vegetable oil or epoxy methyl ester.

7. The environment-friendly leuco dye vegetable oil solvent of claim 6, wherein the raw material C is vegetable oil methyl ester and D is epoxy methyl ester.

8. The environment-friendly leuco dye vegetable oil solvent of claim 6, wherein a mass ratio of formic acid, catalyst and hydrogen peroxide in step 1) is (0.5-0.7): 1:(1-0.9) and the mass ratio of the raw material C to peroxyformic acid in step 2) is (5-7): 1.

9. The environment-friendly leuco dye vegetable oil solvent of claim 3, wherein steps of the chlorine substitution modification method of the vegetable oil methyl ester are as follows:
1) mixing vegetable oil methyl ester and methanol, and then adding catalyst to obtain a mixed solution, the catalyst being a selective one from a group consisting of benzoyl peroxide and azodiisobutyronitrile; and
2) introducing Chlorine gas into the mixed solution obtained in step 1) and controlling the temperature at 70-85° C. and the reaction time for 7-8 h to obtain a chlorinated fatty acid methyl ester.

10. The environment-friendly leuco dye vegetable oil solvent of claim 9, wherein a mass ratio of the vegetable oil methyl ester, methanol and catalyst in step 1) is (100-200):(10-20): 1 and the flow rate of the chlorine gas in the step 2) is 50-60 mL/min.

11. The environment-friendly leuco dye vegetable oil solvent of claim 7, wherein the mass ratio of formic acid, catalyst and bio-oxidation in step 1) is (0.5-0.7): 1:(1-0.9) and the mass ratio of raw material C to peroxyformic acid in step 2) is (5-7): 1.

* * * * *